(12) United States Patent
Ohashi et al.

(10) Patent No.: US 7,468,493 B2
(45) Date of Patent: Dec. 23, 2008

(54) METHOD OF CONNECTING ALUMINUM ALLOY DIE CAST MEMBER

(75) Inventors: Osamu Ohashi, Niigata (JP); Koji Wada, Tsukuba-gun (JP); Keiichi Minegishi, Tsukuba-gun (JP); Yasunori Yoshida, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/942,008

(22) Filed: Sep. 16, 2004

(65) Prior Publication Data
US 2005/0067383 A1    Mar. 31, 2005

(30) Foreign Application Priority Data
Sep. 26, 2003    (JP) ............................. 2003-336406

(51) Int. Cl.
*B23K 11/16* (2006.01)
(52) U.S. Cl. .................................. 219/78.01
(58) Field of Classification Search ............ 219/78.01, 219/78.02, 85.14, 85.15
See application file for complete search history.

(56) References Cited

U.S. PATENT DOCUMENTS 4,838,474 A * 6/1989 Ohashi et al. ............... 228/121
5,753,885 A * 5/1998 Iwasa et al. ................. 219/118

FOREIGN PATENT DOCUMENTS

| EP | 0 659 517 A1 | | 12/1994 |
|---|---|---|---|
| JP | 63-220987 A | * | 9/1988 |
| JP | 2002-35955 A | * | 2/2002 |

* cited by examiner

*Primary Examiner*—Kevin P Kerns
(74) *Attorney, Agent, or Firm*—Oblon, Spivak, McClelland, Maier & Neustadt, P.C.

(57) ABSTRACT

A method of connecting a plurality of aluminum alloys molded as a die cast member while maintaining the molded shape of the alloy is provided. An intermediate material in the form of plate or powder made of aluminum alloy is allowed to intercalate between mutually connecting surfaces of die cast members, the die cast member and/or intermediate material is constituted of an aluminum alloy, at least one of mutually contacting surfaces of the connecting surfaces and the intermediate material is constituted of a rough surface to enhance electric resistance between the contacting surfaces and the connecting surfaces are connected by applying electric current through the connecting surfaces.

10 Claims, 4 Drawing Sheets

METHOD OF CONNECTING ALUMINUM ALLOY DIE CAST MEMBER

BACKGROUND OF THE INVENTION

1. Field of the Invention

The present invention relates to a method of mutually connecting aluminum alloy die cast members, further specifically, to a method of simply and strongly connecting a plurality of aluminum alloys molded as a die cast member while maintaining the molded shape of the alloy.

2. Description of Related Art

Aluminum alloy die cast members are suitable when parts having a relatively simple shape are molded in large amount, and for obtaining parts having a relatively complicated shape in large amount, it is desirable that aluminum alloy die cast members molded in simple shape are mutually connected by a simple means.

However, in the case of this mutual connecting of aluminum alloy die cast members, these die cast members are previously molded into desired shape, therefore, it is necessary to use a method causing no deformation of parts by partial melting of connecting surfaces while maintaining the shape thereof in connecting, or a method capable of correctly prospecting its deformation amount to a certain degree, and capable of performing simple connecting. Unless such a method is not used, when, for example, die cast members having grooves in the form of semi-cylinder on a connecting surface are to be mutually connected to form cylindrical pores between connecting surfaces by these grooves in the form of semi-cylinder, cylindrical pores are not obtained due to deformation between connecting surfaces, and even if the members are connected, they cannot be used sufficiently.

As a method which can be utilized for connection of such members, there are conventionally known methods such as, for example, spot welding, upset butt welding, pulse energizing connection and the like, however, in these methods, connecting surfaces in mutual contact under pressure are partially melted and connected in a short period of time, consequently, a merit of short connecting time is provided, however, since deformation is generated by melting at welding parts of members to be connected, this is not necessarily suitable as a method for connecting a plurality of aluminum alloys molded as a die cast member while maintaining the molding shape of the alloys.

Further, in an aluminum alloy molded as a die cast member, a chemically stable surface oxide membrane $Al_2O_3$ is formed on its surface and it constitutes a disturbance against connection, therefore, in connecting members, it is necessary that the membrane is removed mechanically or metallurgically and the members can be connected strongly by a simple means.

As the method for removing this surface membrane and effecting stable connection, a technology as disclosed in Japanese Patent Application Publication (JP-B) No. 5-62034 has been previously developed. Japanese Patent Application Laid-Open (JP-A) No. 2002-35955 discloses a technology for heating connecting surfaces simply.

Further specifically, in the method of connecting aluminum and the like disclosed in the patent document No. 5-62034, aluminum or aluminum alloy containing 0.2 to 3 wt % of magnesium is allowed to intercalate between connecting surfaces, and the connecting surfaces are pressed and heated at the diffusion temperature of magnesium in a high vacuum atmosphere ($10^{-5}$ Torr), thereby diffusing magnesium at the connecting interface, and the connecting surfaces are tried to be connected strongly by reduction of the oxide membrane by magnesium.

Further, in the method of producing an aluminum alloy die cast member disclosed in JP-A 2002-35955, connecting surfaces of members to be connected are subjected to processing such as grinding, polishing and the like to give a rough surface having a surface roughness (maximum height Ry) of 30 to 200 μm, and clean connecting surfaces are mutually contacted and electric current is applied through along a direction perpendicular to the connecting surface to generate heat by resistance and the connecting surfaces are connected under pressure, wherein the heating temperature in applying electric current is 400 to 500° C. and the pressure at the connecting surface is 10 to 50 MPa. It is also described therein that a metal powder can be distributed smoothly on concave portions of a rough surface.

The method of patent document 5-62034 suggests a technology effective for removing an oxide membrane by the reducing action of magnesium to enhance connection strength, however, JP-B 5-62034 does not suggest connecting a plurality of aluminum alloys while maintaining its molded shape, additionally, the technology of JP-B 5-62034 is not suitable for simple connecting on die cast members produced in large amount, since it is necessary to heat for a long period of time while pressing in a high vacuum atmosphere ($10^{-5}$ Torr).

Further, the method of JP-A 2002-35955 has a main object of performing connecting of high strength at low temperature by conducting effectively partial heating of connecting surfaces by energizing heating utilizing irregularity of the connecting surfaces, and does not remarkably consider removal of the oxide membrane.

SUMMARY OF THE INVENTION

The present invention has been made to enable production of a part of complicated shape by mutually connecting aluminum alloy die cast members of relatively simple shape, and its technological object is to basically provide a method of simply and strongly connecting a plurality of aluminum alloys molded as a die cast member while maintaining its molded shape, effectively utilizing the technologies described in JP-B5-62034 and JP-A 2002-35955.

A further specific technological object of the present invention is to provide a connecting method in which a chemically stable surface oxide membrane formed on a connecting surface of the die cast member can be simply removed even in atmosphere, inert gas atmosphere or in low vacuum atmosphere, in connecting aluminum alloy die cast members, thereby connecting the connecting surfaces strongly.

Another technological object of the present invention is to provide a method causing no deformation of molded die cast members by partial melting of connecting surfaces while maintaining the shape of the members in the above-mentioned connecting, or a method capable of correctly prospecting its deformation amount to a certain degree, and capable of simply connecting the members.

Still another technological object of the present invention is to provide a method of connecting aluminum alloy die cast members in which heating of connecting surfaces of die cast members to be connected is conducted by applying electric current through the connecting surfaces, and this heat generation at the connecting surfaces can be effectively utilized for heating for connection of the members and for promotion of the reaction of an aluminum oxide membrane at the connecting surface.

The first die cast member connecting method of the present invention for solving the above-mentioned problems is a method of mutually connecting aluminum alloy die cast members, wherein in allowing an intermediate material in the form of plate made of aluminum alloy to intercalate between mutually connecting surfaces of the die cast members and heating the connecting surfaces while mutually pressing to connect them, the die cast member and/or intermediate material is constituted of an aluminum alloy containing 0.3 to 2.5 wt % of magnesium, at least one of mutually contacting surfaces of the connecting surfaces and the intermediate material is constituted of a rough surface having a surface roughness of 20 to 300 μm to enhance electric resistance between the contacting surfaces and the die cast members and the intermediate member are allowed to contact, electric current is applied through the connecting surfaces to cause heat generation at temperatures suitable for non-melt connecting at contact parts of the rough surface, and the connecting surfaces are connected while promoting the reduction reaction of an aluminum alloy oxide membrane by magnesium in the intermediate material by heating around the connecting surfaces.

The second die cast member connecting method of the present invention for solving the above-mentioned problems is a method of mutually connecting aluminum alloy die cast members, wherein in allowing an intermediate material in the form of powder made of aluminum alloy to intercalate between mutually connecting surfaces of the die cast members and heating the connecting surfaces while mutually pressing to connect them, the die cast member and/or intermediate material is constituted of an aluminum alloy containing 0.3 to 2.5 wt % of magnesium, the connecting surfaces of the die cast members in contact with the intermediate material are constituted of a rough surface having a surface roughness of 20 to 300 μm and the intermediate material is constituted of a powder having an average particle size of 10 to 250 μm, and the intermediate material is allowed to intercalate in the form of layer between the connecting surfaces, to contact the connecting surfaces while enhancing electric resistance between them, electric current is applied through the connecting surfaces to cause heat generation at temperatures suitable for non-melt connecting at contact parts of the connecting surface with the powder, and the connecting surfaces are connected while promoting the reduction reaction of an aluminum alloy oxide membrane by magnesium in the intermediate material by heating around the connecting surfaces.

In the second aluminum alloy die cast member connecting method, the intermediate material is used as a sheet obtained by binding powder made of aluminum alloy with an organic binder, or powder made of aluminum alloy can be applied by spraying it on at least one of the connecting surfaces to be connected.

In the first and second connecting methods, in applying current to heat around connecting surfaces of the die cast members while mutually pressing to connect the members, the mutually connecting surfaces of the die cast members and the intermediate material are heated at temperatures not causing deformation of the shape around the connecting surfaces by local melting and the like or heated in an embodiment in which its deformation amount can be correctly prospected, and the molded die cast members can be connected while maintaining the shape of the members, alternatively, a positioning part is provided on the die cast members for setting their connecting position, and the die cast members are mutually positioned at the positioning part and the connection by applying electric current can be conducted.

In the first and second connecting methods, the mutual connection of the die cast members can be conducted in atmosphere, inert gas atmosphere or low vacuum atmosphere.

In connecting the die cast members, it is preferable that the temperature of heating around the connecting surfaces by applying electric current is controlled at temperatures from the solidus line temperature of an aluminum alloy constituting the die cast members and intermediate material to 440° C.

In the first and second connecting methods of the present invention, instead of the aluminum alloy containing 0.3 to 2.5 wt % of magnesium constituting the die cast members to be connected or the intermediate material, an aluminum alloy containing 0.1 to 1.0 wt % of lithium can be used.

In the connecting method of the present invention having the above-mentioned constitution, in applying current to heat around connecting surfaces of the aluminum alloy die cast members while mutually pressing to connect the members, the connecting surfaces and the intermediate material are heated at temperatures not causing deformation of the shape around the connecting surfaces by local melting and the like or heated in an embodiment in which its deformation amount can be correctly prospected, and the molded die cast members are connected while maintaining the shape of the members, alternatively, a positioning part is provided on the die cast members for setting their connecting position, and the die cast members are mutually positioned at the positioning part and the connection by applying electric current is conducted, therefore, the die cast members molded previously in given shape are mutually connected while maintaining the molded shape.

Further, in connecting aluminum alloy die cast members, mutually connecting surfaces of the die cast members are so formed as to give a surface roughness of 20 to 300 μm, further, powder is used as the intermediate material, and the like to enhance electric resistance at the connecting surfaces, and by applying electric current through the connecting surfaces, parts around the connecting surfaces are heated concentratedly and effectively at temperatures (solidus line temperature to 440° C.) suitable for connecting, further, the content of magnesium around the connecting surfaces is controlled to 0.3 to 2.5 wt %, therefore, the reduction reaction of an oxide membrane at the connecting surfaces is promoted and a chemically stable surface oxide membrane formed on the connecting surface of the die cast member can also be removed in atmosphere, inert gas atmosphere or in low vacuum atmosphere, thereby strongly connecting the connecting surfaces.

According to the method of connecting aluminum alloy die cast members of the present invention described above in detail, a plurality of aluminum alloys molded as a die cast member can be strongly connected while maintaining the molded shape thereof and removing an oxide membrane by the reduction reaction by magnesium and the like, additionally, there is no substantial melting at the connecting surfaces of the die cast members, consequently, this method can be effectively utilized for fabrication and connecting of various precision parts.

DESCRIPTION OF THE PREFERRED EMBODIMENTS

Figure 1:
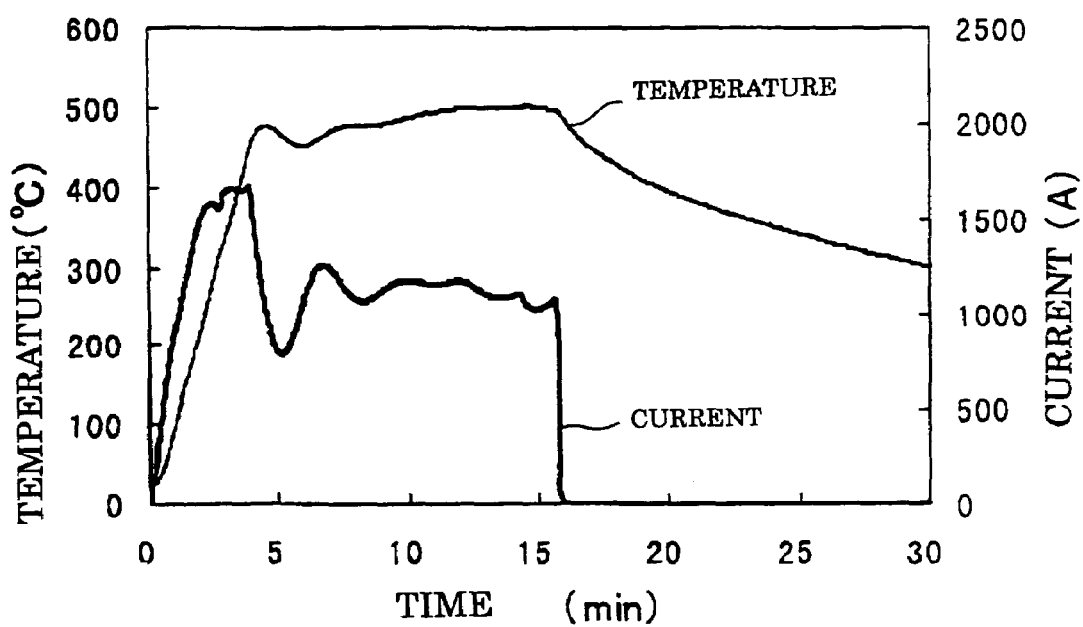
FIG. 1 is a graph showing one example of control embodiments when parts around connecting surfaces of die cast members are heated by applying electric current through the members.

Embodiments of the method of connecting aluminum alloy die cast members according to the present invention will be illustrated below referring to drawings.

The aluminum alloy members to be connected by the present invention are aluminum alloys molded as a die cast member. This aluminum alloy die cast member is suitable when parts of relatively simple shape are molded in large amount, however, in the case of parts of complicated shape, high level technologies are often necessary for molding thereof, consequently, it is desired to develop a technology for mutually connecting, by a simple means, aluminum alloy die cast members molded in simple shape, and the present invention satisfies this requirement.

A matter to be considered in this connecting of die cast members is that these die cast members are previously molded into given shape, consequently, in connecting, a plurality of members can be simply connected while maintaining the molded shape thereof, and a chemically stable oxide membrane $Al_2O_3$ is formed on the surface of an aluminum alloy member and this disturbs connecting, therefore, it is necessary, in connecting the members, to remove this membrane simply.

The present inventors have noticed that in the case of an aluminum alloy die cast member, the reduction reaction of an aluminum alloy oxide membrane by magnesium and lithium is effective, that for heating concentratedly and efficiently parts around connecting surfaces at temperatures suitable for connecting die cast members, it is appropriate to enhance electric resistance around connecting surfaces, and to apply electric current through a die cast member itself via connecting surfaces to control heating, that, particularly, heating by this applying of electric current not only acts effectively on connecting of parts, but also on promotion of the reduction reaction of an oxide membrane by magnesium, and that the application of electric current can decrease current density to, for example, about $1/100$ to $1/1000$ as compared with a conventional resistance welding method, by enhancing electric resistance at connecting surfaces of die cast members and effecting concentrated heating at parts around the connecting surfaces, further, by this heating, die cast members are connected without melting, therefore, the deformation of connecting parts can be suppressed to minimum and the deformation itself can be controlled in a prospectable range, based on their empirical and experimental acquaintances, leading to completion of the invention.

In the aluminum alloy die cast members as a subjected to be connected in the present invention, an intermediate material made of aluminum alloy is allowed to intercalate between connecting surfaces thereof in connecting, and the die cast member and/or the intermediate material is constituted of an aluminum alloy containing magnesium. For example, when die cast members to be connected are made of an aluminum alloy containing no magnesium such as ADC12 (Al-2.15 Cu-11.0 Si-0.44 Fe) and the like, an aluminum alloy containing magnesium is used as the intermediate material to be intercalated therebetween. Magnesium in the die cast member or intermediate material contributes to the reduction reaction of an aluminum alloy oxide membrane, and as is known from examples described below, it is experimentally confirmed that a content thereof of 0.3 to 2.5 wt % is effective for removing an oxide membrane to obtain excellent connecting strength.

This removal of an oxide membrane by magnesium is caused by reaction of $Al_2O_3$ with Mg at a connecting surface to give a coagulant $MgAl_2O_3$, and when the magnesium content is less than 0.3 wt %, the reduction reaction of an oxide membrane is insufficient and secure connecting cannot be conducted, and when the magnesium content is over 4 wt %, MgO is formed on the surface instead of $Al_2O_3$, consequently, the reduction reaction of magnesium does not occur, and secure connecting cannot be conducted.

Here, cases using magnesium which is easily added and having inexpensive price have been explained, however, it is possible to use an aluminum alloy containing 0.1 to 1.0 wt % of lithium showing the same reducing action instead of the magnesium, including any cases described later.

In connecting of an aluminum alloy having magnesium content of 0.3 wt % or less, an aluminum alloy containing 0.3 to 2.5 wt % of magnesium can be used as an intermediate material. On the other hand, even in the case of connecting of aluminum die cast alloy having a magnesium content of 0.3 wt % or more, an aluminum alloy containing 0.3 to 2.5 wt % of magnesium can be used as an intermediate material.

As the intermediate material, those in the form of thin plate or powder as described later can be used, however, in any intermediate materials, a connecting surface of the die cast member, namely, a surface coming into contact with the intermediate material is usually constituted previously of a rough surface having a surface roughness (Rz: maximum height, JIS B 0601-2001) of 20 to 300 μm. As is known from examples described later, when this surface roughness if less than 20 μm or over 300 μm, suitable connecting strength is not obtained.

The rough surface is effective since parts in contact with an intermediate material are composed of a plurality of fine points, electric resistance therebetween is enhanced and when electric current is applied through connecting surfaces, local heat generation is caused on connecting parts thereof, and by heating parts around the connecting surfaces, the connecting surfaces are connected while promoting the reduction reaction of an aluminum alloy oxide membrane by magnesium in the intermediate material.

The rough surface may be formed by mechanical processing of connecting surfaces in connecting die cast members, however, the connecting surfaces can be formed into a rough surface in molding die cast members, thereby omitting the mechanical processing to reduce production cost.

On the other hand, with the intermediate material, electric resistance between contact surfaces with die cast members is enhanced and the die cast members are allowed to contact, and electric current is applied through the contact surface, to cause heat generation of an aluminum alloy at temperatures suitable for non-melt connecting at contact part of the rough surface, specifically temperatures from 440° C. to solidus line temperature, and by thus heating parts around the contact surface, the connecting surfaces are connected while promoting the reduction reaction of an aluminum alloy oxide membrane by magnesium contained in the die cast member or the intermediate material.

As the intermediate material, an intermediate material in the form of plate can be allowed to intercalate between connecting surfaces of die cast members, and in this case, the connecting surface of a die cast member can be constituted of a rough surface having a surface roughness of 20 to 300 μm and the front and rear surfaces of an intermediate material can be formed as a smooth surface or a surface close thereto, however, the front and rear surfaces of an intermediate material in the form of plate can also be constituted of a rough surface having a surface roughness of 20 to 300 μm together with the connecting surface of a die cast membrane, further, it is also possible that the connecting surface of a die cast member is formed as a smooth surface or a surface close thereto and only the front and rear surfaces of an intermediate material in the form of plate are constituted of a rough surface having a surface roughness of 20 to 300 µm.

As the intermediate material, powder having an average particle size of 10 to 250 µm can be used, and this is intercalated in the form of layer between the connecting surfaces, thus, electric resistance between the connecting surfaces can be enhanced. Powder having an average particle size of 10 to 250 µm corresponds to a surface roughness of 20 to 300 µm on the die cast member or the intermediate material, and when out of this range, resultantly, connecting becomes insufficient or sufficient connecting strength is not obtained.

As the intermediate material in the form of powder, an aluminum alloy containing no magnesium can be used when the die cast members is an aluminum alloy containing magnesium, however, when the die cast members is an aluminum alloy containing no magnesium, it is of course necessary to use an aluminum alloy containing 0.3 to 2.5 wt % of magnesium.

When this intermediate material in the form of powder is used, the connecting surface of the die cast member is so formed to have a surface roughness of 20 to 300 µm.

The intermediate material in the form of powder can be made as a sheet obtained by connecting an aluminum alloy powder with an organic binder, and as the organic binder, various binders which are gasified and discharged by heating connecting surfaces for connecting die cast members can be used. Specifically, 80 wt % of an aluminum alloy powder and 20 wt % of the organic binder constituting an intermediate material are mixed to give a paste, and this is drawn in the form of plane and dried, to give a binder to be used.

The powder made of aluminum alloy as an intermediate material can be applied by spraying it on at least one of connecting surfaces to be connected, and in this case, the powder as an intermediate material can be supported in liquid having the same nature as that of the organic binder and sprayed. Further, an aluminum alloy can be applied by this spraying on an intermediate material in the form of plate.

In connecting of the die cast members, by applying electric current through the connecting surfaces, parts around contacting of the contact surface with the intermediate material are heated concentratedly at temperatures suitable for non-melt connecting (usually, solidus line temperature to about 440° C.), and by this heating, the connecting surfaces are connected while promoting the reduction reaction of an aluminum alloy oxide membrane by magnesium contained in the die cast member or the intermediate material, and in this heating by applying electric current, voltage and electric current are controlled in the ranges of 5 to 10 V and 500 to 2000 A while measuring the temperature around connecting parts, and the temperature around connecting parts is heated in a short period of time to desired temperature in a low vacuum atmosphere (10 Pa), in examples shown below. In the heating by applying electric current, the temperature of connecting interface may increase by local heating, therefore, there is irregularity in temperature depending on measurement positions, and correct measurement is difficult. However, it is necessary that the heating is in the range causing no deformation of the shape around the connecting surfaces by partial melting of the connecting surfaces of die cast members and the intermediate material.

In this temperature rising, when temperature around connecting parts is, for example, 500° C., it is preferable that temperature rising rate is quick until about 470° C. directly before this temperature, and thereafter, temperature is raised slowly until 500° C. for suppressing over shoot. FIG. 1 shows one example of this temperature rising, and electric current value varies around about 1600 A as a peak, and during this, voltage value varies in the range of 0 to 1.3 V together with electric current value, and reaches to the intended temperature of 500° C. in about 12 minutes. Here, the temperature is kept for 4 minutes to connect members, thereafter, electric current is shut off before entering into a cooling process.

Though a direct current power source is used for applying electric current in examples described later, in connecting of the present invention, the waveform of a power source does not exert an influence on connecting at all, therefore, pulse power sources and other power sources having any output waveform may be used.

In connecting of the die cast members, mutually connecting surfaces of the die cast members are formed into a rough surface, further, powder is used as an intermediate material, and the like, thereby increasing electric resistance at connecting surfaces, and parts around connecting surfaces are heated concentratedly and efficiently by applying electric current, therefore, the reduction reaction of an oxide membrane by magnesium in the die cast membrane or intermediate material is promoted effectively, and resultantly, it is not necessarily required to conduct the connecting in vacuum, and an oxide membrane can be removed and members can be strongly connected even in atmosphere, inert gas atmosphere or lower vacuum atmosphere of about 10 Pa, namely, this procedure is suitable for mutual connecting of die cast members produced in large amount. However, connecting in a high vacuum atmosphere is not excluded.

Further, as described above, in the case of connecting of die cast members, it is necessary that the molded shape of die cast members molded previously in given shape is maintained, additionally, members are connected at given interval between connecting surfaces of die cast members having an intermediate material intercalated therebetween.

Figure 4:
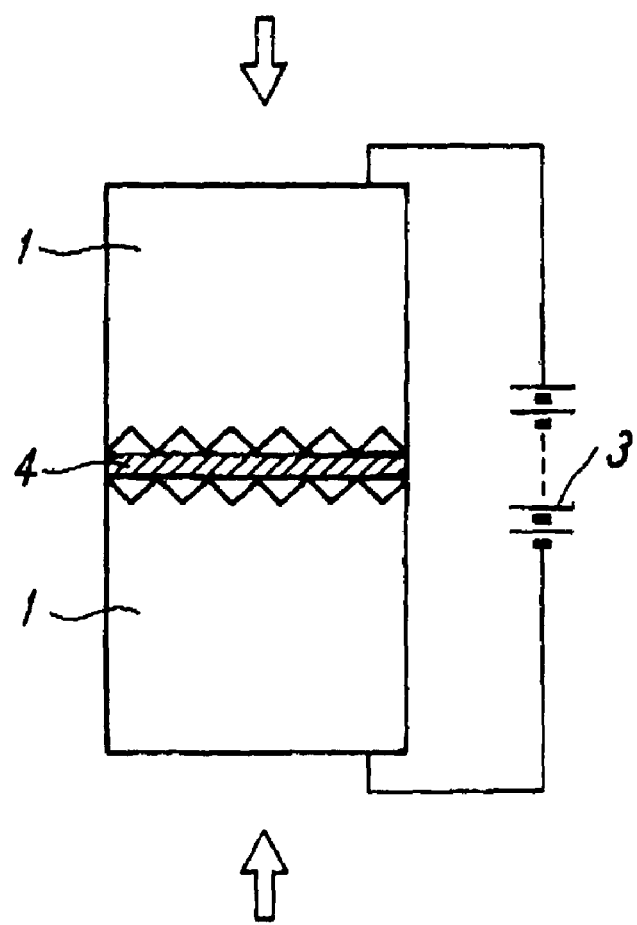
FIG. 4 is a schematic showing another embodiment of connecting die cast members.

Therefore, when the one in the form of plate 4 is used as an intermediate material as shown in FIG. 4, to what dimension interval between connecting surfaces of die cast members is controlled by reducing irregularity of rough surfaces on the connecting surfaces of die cast members and/or on the front and rear surfaces of an intermediate material with the intermediate material, is prospected by calculation and other empirical laws and the like, and the members are connected.

Figure 2:
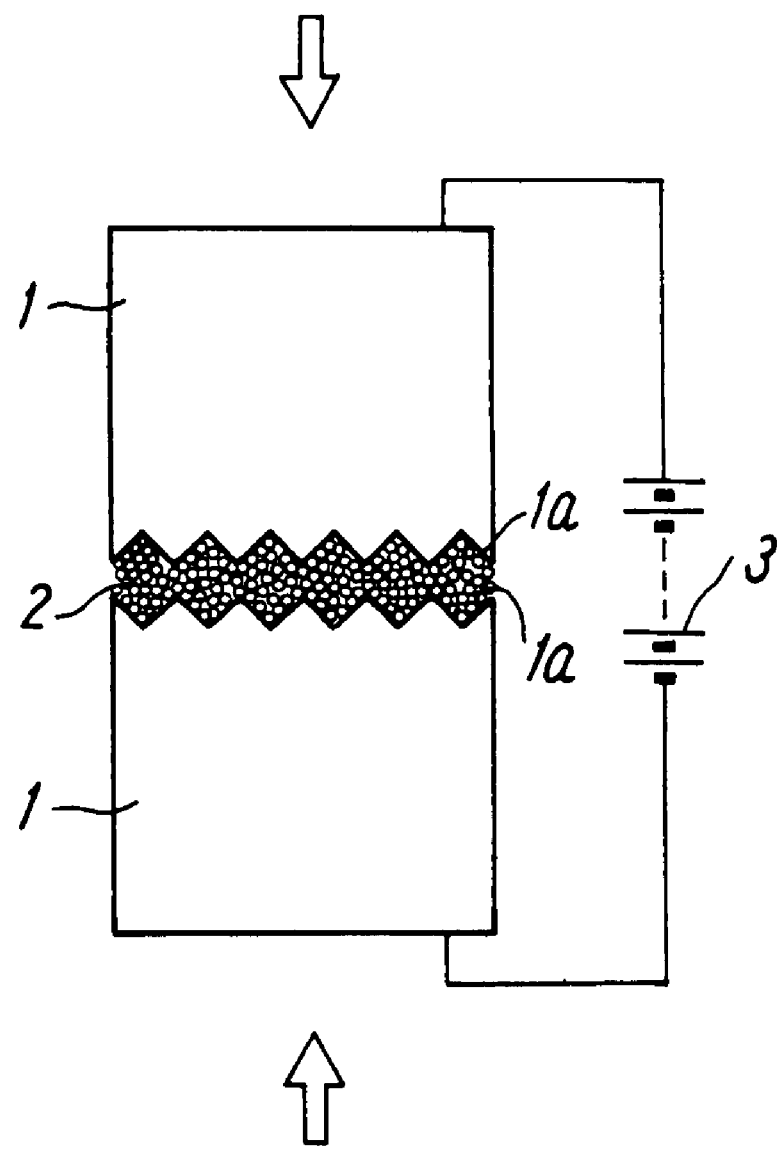
FIG. 2 is an explanation view schematically showing an embodiment of connecting die cast members.

When powder is used as an intermediate material, the thickness when packing density at final connecting of the material (differing depending on pressure) is obtained is calculated from the total weight of powder used, and like in the case of the intermediate material in the form of plate, to what dimension interval between connecting surfaces of die cast members is controlled by reducing irregularity on connecting surfaces of die cast members with the intermediate material, is prospected by calculation and other empirical laws and the like, and the members are connected. FIG. 2 shows schematically a condition in which an intermediate material 2 made of powder reduces irregularity of connecting surfaces 1a, 1a of die cast members 1, 1. In the figure, mark 3 shows a power source for energizing.

Thus, the deformation amount of an intermediate material in connecting can be prospected relatively correctly, therefore, die cast members can be connected to a desired connection condition while maintaining the molded shape.

A dimension between connecting surfaces can be prospected according to the above-mentioned procedure also in the case of use of an intermediate material made of a sheet obtained by bonding an aluminum alloy powder with an organic binder.

Figure 3:
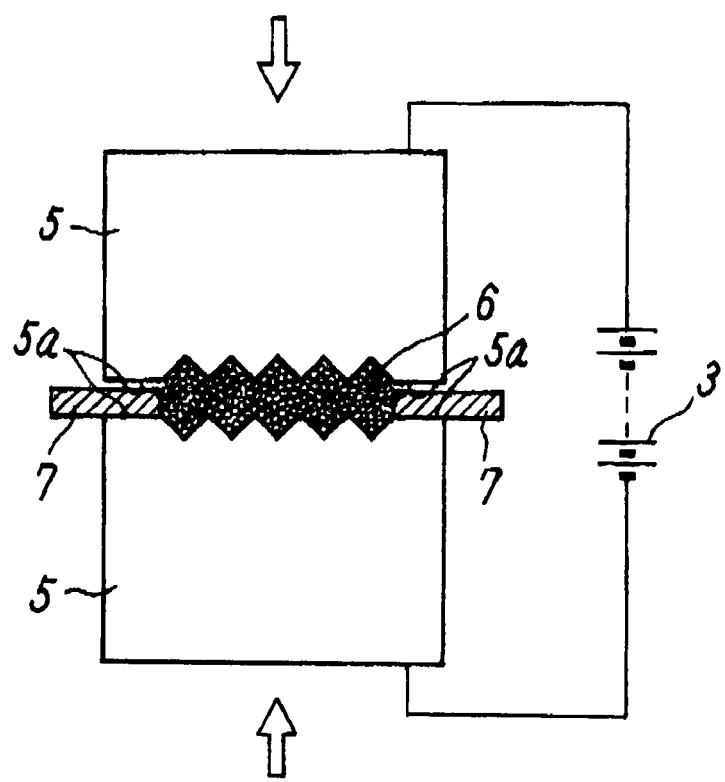
FIG. 3 is an explanation view schematically showing another embodiment of connecting die cast members.

Further, for controlling a dimension between connecting surfaces of die case members after connecting to a constant value correctly, it is also possible, as exemplified in FIG. 3, that positioning parts 5a, 5a for setting connecting positions are provided on die cast members 5, 5, an intermediate material 6 is compressed by pressing for connecting, and the positioning parts 5a, 5a are allowed to contact via a spacer 7 made of an electric insulation material, to mutually position the die cast members 1, 1 and to control an interval between connecting surfaces to a constant dimension, and the members are connected.

In this case, it is necessary that the positioning parts contact via the spacer 7 when the intermediate material 6 is compressed to given packing density, and if necessary, a space into which an excess intermediate material escapes can be provided between connecting surfaces.

Examples of the present invention will be described below, but the scope of the invention should not be construed to be limited to these examples.

In examples described below, round rods having a diameter of 30 mm and a height of 25 mm were cut out from ADC12 (Al-2.15 Cu-11.0 Si-0.44 Fe) aluminum alloy die cast member, and connecting surfaces of this sample were worked into rough surfaces having various surface roughness by turning, and used in experiments.

In the power source, 200 volt was converted by a potential transformer into low voltage, and the whole wave was rectified. The voltage was 5 to 10 volt and the electric current was 500 to 2000 ampere, and the connecting surfaces were kept at 500° C. for 10 minutes by applying electric current, then cooled in air. For measurement of temperature, a hole was made 5 mm above the connecting surface of the sample, and a thermocouple was inserted therein and the temperature was measured.

EXAMPLE 1

Using intermediate materials and connecting conditions as shown in Table 1, the die cast members were connected. As the intermediate material, powders having compositions shown in this table and having an average particle size of about 150 μm were used, and the thickness of a powder layer (0.5 mm) shown in this table as connecting conditions and the like was calculated from the weight and connecting surface of the weighed intermediate material, hypothesizing that the intermediate material powder was packed between connecting surfaces at a packing density of 100% (the same also in the case of tables 2 and 3).

As apparent from results shown in this table, when intermediate materials containing 0.3 to 2.5 wt % of magnesium were used, excellent connecting strengths could be obtained.

TABLE 1

| INTERMEDIATE MATERIAL | CONNECTING CONDITION | JUDGE | CONNECTION STATUS |
|---|---|---|---|
| Al-10% Si-0% Mg | CONNECTING TEMPERATURE: 500° C. | X | NOT CONNECTED |
| Al-10% Si-0.2% Mg | ○ VOLTAGE 5~10 V | X | NOT CONNECTED |
| Al-10% Si-0.4% Mg | ○ CURRENT 500~2000 A | ○ | CONNECTED |
| Al-10% Si-1.0% Mg | PRESSURE: 7 MPa | ○ | CONNECTED |
| Al-10% Si-1.5% Mg | POWDER LAYER THICKNESS: 0.5 mm | ○ | CONNECTED |
| Al-10% Si-2.5% Mg | ATMOSPHERE: 10 Pa | ○ | CONNECTED |
| Al-10% Si-3.0% Mg | SURFACE ROUGHNESS: 50 μm | X | NOT CONNECTED |
| Al-10% Si-5.0% Mg | CONNECTING TIME: 10 min. | X | NOT CONNECTED |

EXAMPLE 2

The surface roughness of connecting surfaces of the die cast members was processed into values shown in Table 2 in the range of 3 to 300 μm (Rz), and as shown in Table 2 as connecting conditions, the die cast members were connected using powder of Al—Mg alloy (Al-12 Si-1 Mg) as an intermediate material.

As apparent from results shown in this table, when the surface roughness was 3 μm and 10 μm, sufficient connecting strength was not obtained, however, when the surface roughness was larger, excellent connecting strength could be obtained.

TABLE 2

| SURFACE ROUGHNESS | CONNECTING CONDITION | JUDGE | CONNECTION STATUS |
|---|---|---|---|
| Rz: 3 μm | CONNECTING TEMPERATURE: 500° C. | X | NOT CONNECTED |
| Rz: 10 μm | ○ VOLTAGE5~10 V | X | NOT CONNECTED |
| Rz: 30 μm | ○ CURRENT500~2000 A | ○ | CONNECTED |
| Rz: 50 μm | PRESSURE: 7 Mpa | ○ | CONNECTED |
| Rz: 100 μm | POWDER LAYER THICKNESS: 0.5 mm | ○ | CONNECTED |

TABLE 2-continued

| SURFACE ROUGHNESS | CONNECTING CONDITION | JUDGE | CONNECTION STATUS |
|---|---|---|---|
| Rz: 300 μm | POWDER COMPOSITION: Al-12Si-1Mg<br>ATMOSPHERE: 10 Pa<br>CONNECTING TIME: 10 min. | ○ | CONNECTED |

EXAMPLE 3

The above-mentioned die cast members were used, and connected under connecting conditions shown in Table 3 using powders, plate materials and powder sheets (made into a sheet by binding powder with an organic binder) shown in Table 3 as an intermediate material.

When any intermediate materials were used, sufficient connecting strengths were obtained.

TABLE 3

| INTERMEDIATE MATERIAL | CONNECTING CONDITION | JUDGE | CONNECTION STATUS |
|---|---|---|---|
| Al—12Si—1Mg<br>(POWDER)<br>POWDER LAYER THICKNESS: 0.5 mm | CONNECTING TEMPERATURE:<br>500° C.<br>PRESSURE: 7 Mpa | ○ | CONNECTED |
| Al—10.5Si—2.6Cu—0.33Mg<br>(PLATE)<br>PLATE THICKNESS: 0.5 mm | ATMOSPHERE: 10 Pa<br>SURFACE ROUGHNESS:<br>Rz50 μm | ○ | CONNECTED |
| Al—12Si—1Mg<br>(POWDER SHEET)<br>SHEET THICKNESS: 0.5 mm | CONNECTING TIME: 10 min. | ○ | CONNECTED |

COMPARATIVE EXAMPLE

In any of Examples 1 to 3, connecting was conducted under 5 the same conditions but using no intermediate material intercalated, and in any cases, sufficient connecting strength could not be obtained.

The invention claimed is:

1. A method of connecting aluminum alloy die cast members, comprising:
   allowing an intermediate material in the form of a plate made of aluminum alloy to intercalate between mutually connecting surfaces of the die cast members made of aluminum alloy, the die cast members are configured to generate heat by turning on electricity and are connected while mutually pressing;
   providing positioning parts for setting a mutual position where the die cast members connect at a different position from the connecting surface in the die cast members;
   providing at least one of connecting surfaces of the die cast members and front and rear surfaces of the intermediate material on a rough surface having a surface roughness of 20 to 300 μm to enhance electric resistance between the connecting surfaces of die cast members and the intermediate material;
   providing a spacer between the die cast members, the spacer being made of an electric insulation and being different from the intermediate material, the spacer intercalates between the positioning parts of the die cast members;
   pressing the die cast members after the intermediate material intercalates between the connecting surfaces of the die cast members; and
   applying electric current to the die cast members and the intermediate material through respective connecting surfaces, the connecting surfaces allowing heat generation at a temperature suitable for non-melt connecting, whereby the die cast members are connected while performing reduction of an aluminum alloy oxide membrane by magnesium, and an interval between the die cast members is determined by a thickness of the spacer, wherein the die cast member and/or intermediate material contains 0.3 to 2.5 wt % of magnesium.

2. The method of connecting aluminum alloy die cast members according to claim 1, wherein said mutual connection of the die cast members is conducted in atmosphere, inert gas atmosphere or low vacuum atmosphere.

3. The method of connecting aluminum alloy die cast members according to claim 1, wherein instead of the aluminum alloy containing 0.3 to 2.5 wt % of magnesium constituting the die cast members to be connected or intermediate material, an aluminum alloy containing 0.1 to 1.0 wt % of lithium is used.

4. The method of connecting aluminum alloy die cast members according to claim 1, wherein the temperature of heating around the connecting surfaces by applying electric current is controlled at temperatures from a solidus line temperature of an aluminum alloy constituting the die cast members and intermediate material to 440° C.

5. A method of connecting aluminum alloy die cast members, comprising:
   allowing an intermediate material in the form of a powder made of aluminum alloy to intercalate between mutually connecting surfaces of the die cast members made of aluminum alloy, the die cast members are configured to generate heat by turning on electricity and are connected while mutually pressing, the die cast member and/or intermediate material contains 0.3 to 2.5 wt % of magnesium, the intermediate material is constituted of powder having an average particle size of 10 to 250 μm, and the die cast members have positioning parts for setting a mutual position where the die cast members connect at a different position from the connecting surface;
   providing the connecting surface which comes in contact with the intermediate material of a rough surface having a surface roughness of 20 to 300 μm to enhance electric resistance between the connecting surfaces of die cast members and the intermediate material;

providing a spacer between the die cast members, the spacer being made of an electric insulation and being different from the intermediate material, the spacer intercalates between the positioning parts of the die cast members;

pressing the die cast members after the intermediate material intercalates between the connecting surfaces of the die cast members; and applying electric current to the die cast members and the intermediate material through respective connecting surfaces, the connecting surfaces allowing heat generation at a temperature suitable for non-melt connecting, whereby the die cast members are connected while performing reduction of an aluminum alloy oxide membrane by magnesium, and an interval between the die cast members is determined by a thickness of the spacer.

6. The method of connecting aluminum alloy die cast members according to claim 5, wherein said intermediate material is a sheet obtained by connecting powders with an organic binder.

7. The method of connecting aluminum alloy die cast members according to claim 5, wherein said powder made of aluminum alloy as said intermediate material is applied by spraying it on at least one of the connecting surface.

8. The method of connecting aluminum alloy die cast members according to claim 5, wherein said mutual connection of the die cast members is conducted in atmosphere, inert gas atmosphere or low vacuum atmosphere.

9. The method of connecting aluminum alloy die cast members according to claim 5, wherein instead of the aluminum alloy containing 0.3 to 2.5 wt % of magnesium constituting the die cast members to be connected or intermediate material, an aluminum alloy containing 0.1 to 1.0 wt % of lithium is used.

10. The method of connecting aluminum alloy die cast members according to claim 5, wherein the temperature of heating around the connecting surfaces by applying electric current is controlled at temperatures from a solidus line temperature of an aluminum alloy constituting the die cast members and intermediate material to 440° C.

* * * * *